(12) United States Patent
Zhang et al.

(10) Patent No.: US 9,954,730 B2
(45) Date of Patent: Apr. 24, 2018

(54) METHOD FOR DELIVERING STATIC ROUTE AND ULTIMATE PROVIDER EDGE

(71) Applicant: Huawei Technologies Co., Ltd., Shenzhen, Guangdong (CN)

(72) Inventors: Xia Zhang, Beijing (CN); Xuan Wang, Beijing (CN); Xuefeng Lai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 15/015,728

(22) Filed: Feb. 4, 2016

(65) Prior Publication Data

US 2016/0156511 A1 Jun. 2, 2016

Related U.S. Application Data

(63) Continuation of application No. PCT/CN2014/081801, filed on Jul. 8, 2014.

(30) Foreign Application Priority Data

Aug. 12, 2013 (CN) .......................... 2013 1 0349619

(51) Int. Cl.
*H04L 12/24* (2006.01)
*H04L 12/64* (2006.01)
(Continued)

(52) U.S. Cl.
CPC ...... *H04L 41/0803* (2013.01); *H04L 12/6418* (2013.01); *H04L 45/74* (2013.01);
(Continued)

(58) Field of Classification Search
CPC .................................................. H04L 41/0803
See application file for complete search history.

(56) References Cited

U.S. PATENT DOCUMENTS

2006/0221971 A1* 10/2006 Andrieux ............... H04L 45/54
370/392
2012/0260337 A1 10/2012 Van Der Merwe
(Continued)

FOREIGN PATENT DOCUMENTS

| CN | 101098347 A | 1/2008 |
|---|---|---|
| CN | 102281533 A | 12/2011 |

(Continued)

OTHER PUBLICATIONS

R. Droms, "Dynamic Host Configuration Protocol", Network Working Group, Mar. 1997, 45 pages.
(Continued)

*Primary Examiner* — John Blanton

(57) ABSTRACT

The present invention is applicable to and relates to the field of communications technologies, and provides a method for delivering a static route and an ultimate provider edge (UPE). The method includes: reading, by a UPE, a packet; and delivering a corresponding static route according to related information carried in the packet. The present invention avoids problems that when a site is deployed on a large-scale radio access network, a base station cannot operate normally and a data communications device repeatedly performs troubleshooting and debugging on site caused by differences between preliminary data planning and actual site deployment data. A static route is automatically delivered by processing a packet, thereby reducing manpower costs and avoiding occurrence of human errors.

10 Claims, 6 Drawing Sheets

(51) Int. Cl.
*H04L 12/741* (2013.01)
*H04L 29/12* (2006.01)
*H04W 24/02* (2009.01)
*H04W 88/08* (2009.01)

(52) U.S. Cl.
CPC ........ *H04L 61/103* (2013.01); *H04L 61/2007* (2013.01); *H04L 61/2015* (2013.01); *H04W 24/02* (2013.01); *H04W 88/08* (2013.01)

(56) References Cited

U.S. PATENT DOCUMENTS

2015/0063170 A1 3/2015 Huang et al.
2016/0065463 A1* 3/2016 Wang ...................... H04L 49/70
  370/392

FOREIGN PATENT DOCUMENTS

| CN | 102355402 A | 2/2012 |
| CN | 103024852 A | 4/2013 |
| CN | 103155495 A | 6/2013 |
| CN | 103401787 A | 11/2013 |
| WO | WO 2012/109867 A1 | 8/2012 |

OTHER PUBLICATIONS

S. Alexander et al., "DHCP Options and BOOTP Vendor Extensions", Network Working Group, Mar. 1997, 35 pages.

* cited by examiner

METHOD FOR DELIVERING STATIC ROUTE AND ULTIMATE PROVIDER EDGE

CROSS-REFERENCE TO RELATED APPLICATIONS

This application is a continuation of International Application No. PCT/CN2014/081801, filed on Jul. 8, 2014, which claims priority to Chinese Patent Application No. 201310349619.9, filed on Aug. 12, 2013, both of which are hereby incorporated by reference in their entireties.

TECHNICAL FIELD

The present invention relates to the field of communications technologies, and in particular, to a method for delivering a static route and an ultimate provider edge (UPE).

BACKGROUND

In an IPRAN (Internet Protocol Radio Access Network, Internet Protocol radio access network) network, a wireless device can also be allocated an IP address, and be connected by means of the IPRAN network.

In a 3G/4G network, a wireless base station mostly has multiple IP addresses that are divided into a service IP and a management IP. A static route needs to be manually preconfigured on the data communications device for communication between a data communications device and the service IP of the base station.

The wireless base station is mostly deployed by means of a plug-and-play technology, that is, acquires an interface IP and the management IP by using a DHCP (Dynamic Host Configuration Protocol, Dynamic Host Configuration Protocol) packet. The IP addresses are all preplanned on a DHCP server and are corresponding to ESNs (Electronic Serial Number, electronic serial number) of the base station, where a router that is connected to the wireless base station needs to serve as a DHCP relay agent.

In a process in which a site is deployed on a mobile access network, the base station may perform blind startup without performing any configuration, acquire a management IP1 and a service address IP3 from a server end by means of a DHCP after power-on, and after a management channel is established, then acquire a configuration file of the base station from the server end to reboot with new configuration. The management address IP1 is used to open up the management channel between the base station and the DHCP server; the service address IP3 is used to communicate with an RNC (radio network controller); and the IP1 on the base station and an IP2 on a UPE (ultimate provider edge) are in a same network segment. Moreover, there must be a static route from the UPE to the IP3, and a next hop of the IP3 is the IP1.

However, in the existing technical solution, static routes from a data communications access device UPE to a base station are all implemented by pre-acquiring IP address planning of the base station and manually configuring the UPE.

The wireless base station and the data communications UPE are generally managed by different departments. The IP address planning performed by a wireless side may also change before site deployment is finished; and the static route configured on the UPE needs to be continuously adjusted, and even the IP address planning cannot be correctly conveyed to a data communication department, causing erroneous configuration on the UPE and a failure in communication between the base station and the UPE.

In conclusion, in the prior art, a static route from a UPE to a base station needs to be manually configured by relying on pre-acquisition of planning information of an IP address. The solution consumes manpower costs. Moreover, erroneous configuration leading to a failure in communication easily happens owing to the inaccurate acquired planning information of the IP address or human errors.

SUMMARY

An objective of the present invention is to provide a method for delivering a static route and a UPE, aiming to resolve a problem that in the prior art, a static route from a UPE to a base station needs to be manually configured by relying on pre-acquisition of planning information of an IP address, causing that erroneous configuration leading to a failure in communication easily happens.

According to a first aspect, the method for delivering a static route includes:

reading, by a UPE, a packet; and delivering a corresponding static route according to related information carried in the packet.

In a first possible implementation manner of the first aspect, the reading, by a UPE, a packet is specifically:

reading, by the UPE, a data packet sent by a base station; or reading, by the UPE, a Dynamic Host Configuration Protocol DHCP relay agent packet forwarded to a base station.

With reference to the first possible implementation manner of the first aspect, in a second possible implementation manner, the delivering a corresponding static route according to related information carried in the packet is specifically:

when the UPE reads the data packet sent by the base station, delivering, according to a source IP address and a source MAC address in the data packet, a static route that is from the UPE to a service address of the base station; or when the UPE reads the DHCP relay agent packet forwarded to the base station, delivering a static route according to an IP address in the DHCP relay agent packet.

In a third possible implementation manner of the first aspect, the reading, by a UPE, a packet; and delivering a corresponding static route according to related information carried in the packet is specifically:

receiving, by a UPE port, a data packet sent by a base station;

determining whether automatic static route delivery is enabled for the UPE port;

when it is determined that the automatic static route delivery is enabled, further determining whether a quantity of static routes correspondingly delivered by the UPE port reaches an upper limit value; or when it is determined that the automatic static route delivery is not enabled, ending this operation;

when it is determined that the quantity of static routes correspondingly delivered by the UPE port does not reach the upper limit value, acquiring a source IP address and a source MAC address in the data packet; or when it is determined that the upper limit value is reached, ending this operation;

searching an Address Resolution Protocol ARP table for a next-hop IP address according to the source MAC address; and delivering the corresponding static route according to the next-hop IP address.

In a fourth possible implementation manner of the first aspect, the reading, by a UPE, a packet; and delivering a corresponding static route according to related information carried in the packet is specifically:

receiving, by a UPE port, a data packet sent by a base station;

determining whether automatic static route delivery is enabled for the UPE port;

when it is determined that the automatic static route delivery is enabled, further determining whether a quantity of static routes correspondingly delivered by the UPE port reaches an upper limit value; or when it is determined that the automatic static route delivery is not enabled, ending this operation;

when it is determined that the quantity of static routes correspondingly delivered by the UPE port does not reach the upper limit value, acquiring a source IP address and a source MAC address in the data packet; or when it is determined that the upper limit value is reached, ending this operation;

further determining whether a static route corresponding to the source IP address has been delivered;

when it is determined that the static route corresponding to the source IP has not been delivered, searching an ARP table for a next-hop IP address according to the source MAC address; or when it is determined that the static route corresponding to the source IP has been delivered, ending this operation; and delivering the corresponding static route according to the next-hop IP address.

With reference to the first possible implementation manner of the first aspect, in a fifth possible implementation manner, the reading, by a UPE, a packet; and delivering a corresponding static route according to related information carried in the packet is specifically:

reading, by the UPE from the DHCP relay agent packet, an interface address and a service address that are allocated to the base station; and delivering the static route according to the interface address and the service address.

According to a second aspect, the UPE includes:

a packet reading module, configured to read a packet; and a route delivery module, configured to deliver a corresponding static route according to related information carried in the packet.

In a first possible implementation manner of the second aspect, the packet reading module is specifically configured to read a data packet sent by a base station, or configured to read a DHCP relay agent packet forwarded to a base station; and the route delivery module is specifically configured to, when the UPE reads the data packet sent by the base station, deliver, according to a source IP address and a source MAC address in the data packet, a static route that is from the UPE to a service address of the base station, or configured to, when the UPE reads the DHCP relay agent packet forwarded to the base station, deliver a static route according to an IP address in the DHCP relay agent packet.

In a second possible implementation manner of the second aspect, the UPE further includes:

a packet receiving module, configured to receive a data packet sent by a base station;

an enabling determining module, configured to determine whether automatic static route delivery is enabled for the UPE port;

a quantity determining module, configured to, when it is determined that the automatic static route delivery is enabled, further determine whether a quantity of static routes correspondingly delivered by the UPE port reaches an upper limit value;

an acquisition module, configured to, when it is determined that the quantity of static routes correspondingly delivered by the UPE port does not reach the upper limit value, acquire a source IP address and a source MAC address in the data packet;

a search module, configured to search an ARP table for a next-hop IP address according to the source MAC address; and a delivery module, configured to deliver the corresponding static route according to the next-hop IP address.

In a third possible implementation manner of the second aspect, the UPE further includes:

a packet receiving module, configured to receive a data packet sent by a base station;

an enabling determining module, configured to determine whether automatic static route delivery is enabled for the UPE port;

a quantity determining module, configured to, when it is determined that the automatic static route delivery is enabled, further determine whether a quantity of static routes correspondingly delivered by the UPE port reaches an upper limit value;

an acquisition module, configured to, when it is determined that the quantity of static routes correspondingly delivered by the UPE port does not reach the upper limit value, acquire a source IP address and a source MAC address in the data packet;

a delivery determining module, configured to determine whether a static route corresponding to the source IP address has been delivered;

a search module, configured to, when it is determined that the static route corresponding to the source IP has not been delivered, search an ARP table for a next-hop IP address according to the source MAC address; and a delivery module, configured to deliver the corresponding static route according to the next-hop IP address.

In a fourth possible implementation manner of the second aspect, the UPE further includes:

an address reading module, configured to read from the DHCP relay agent packet an interface address and a service address that are allocated to the base station; and a static route delivery module, configured to deliver the static route according to the interface address and the service address.

In the present invention, a packet is read by using a UPE; and a corresponding static route is delivered according to related information carried in the packet, thereby avoiding problems that when a site is deployed on a large-scale radio access network, a base station cannot operate normally and a data communications device repeatedly performs troubleshooting and debugging on site caused by differences between preliminary data planning and actual site deployment data. A static route is automatically delivered by processing a packet, thereby reducing manpower costs and avoiding occurrence of human errors.

DETAILED DESCRIPTION

To make the objectives, technical solutions, and benefits of the present invention clearer and more comprehensible, the following further describes the present invention in detail with reference to the accompanying drawings and embodiments. It should be understood that the specific embodiments described herein are merely used to explain the present invention but are not intended to limit the present invention.

Embodiment 1

Figure 1:
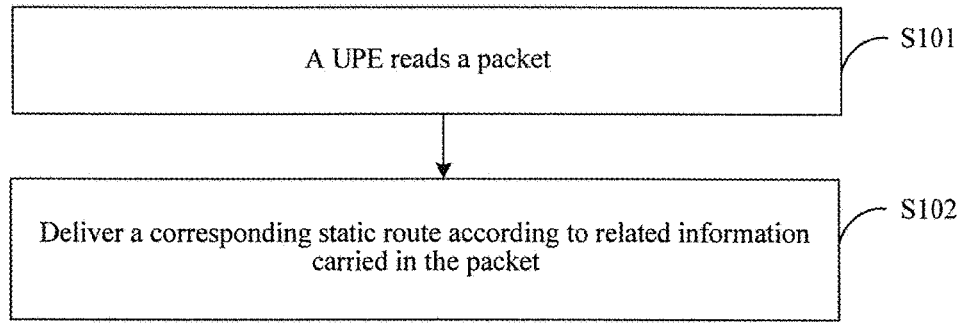
FIG. 1 is a schematic diagram of an implementation process of a method for delivering a static route according to Embodiment 1 of the present invention.

Referring to FIG. 1, FIG. 1 is an implementation process of a method for delivering a static route according to Embodiment 1 of the present invention, where the implementation process includes:

S101: A UPE reads a packet.

As an embodiment of the present invention, the UPE reads a data packet sent by a base station.

As another embodiment of the present invention, the UPE reads a DHCP relay agent packet forwarded to a base station.

S102: Deliver a corresponding static route according to related information carried in the packet.

In this embodiment of the present invention, a static route that is from the UPE to a service address of the base station is delivered.

As an embodiment of the present invention, when the UPE reads the data packet sent by the base station, the static route that is from the UPE to the service address of the base station is delivered according to a source IP address and a source MAC (Media Access Control, Media Access Control) address in the data packet.

As another embodiment of the present invention, when the UPE reads the DHCP relay agent packet forwarded to the base station, a static route is delivered according to an IP address in the DHCP relay agent packet.

Embodiment 2

Figure 2:
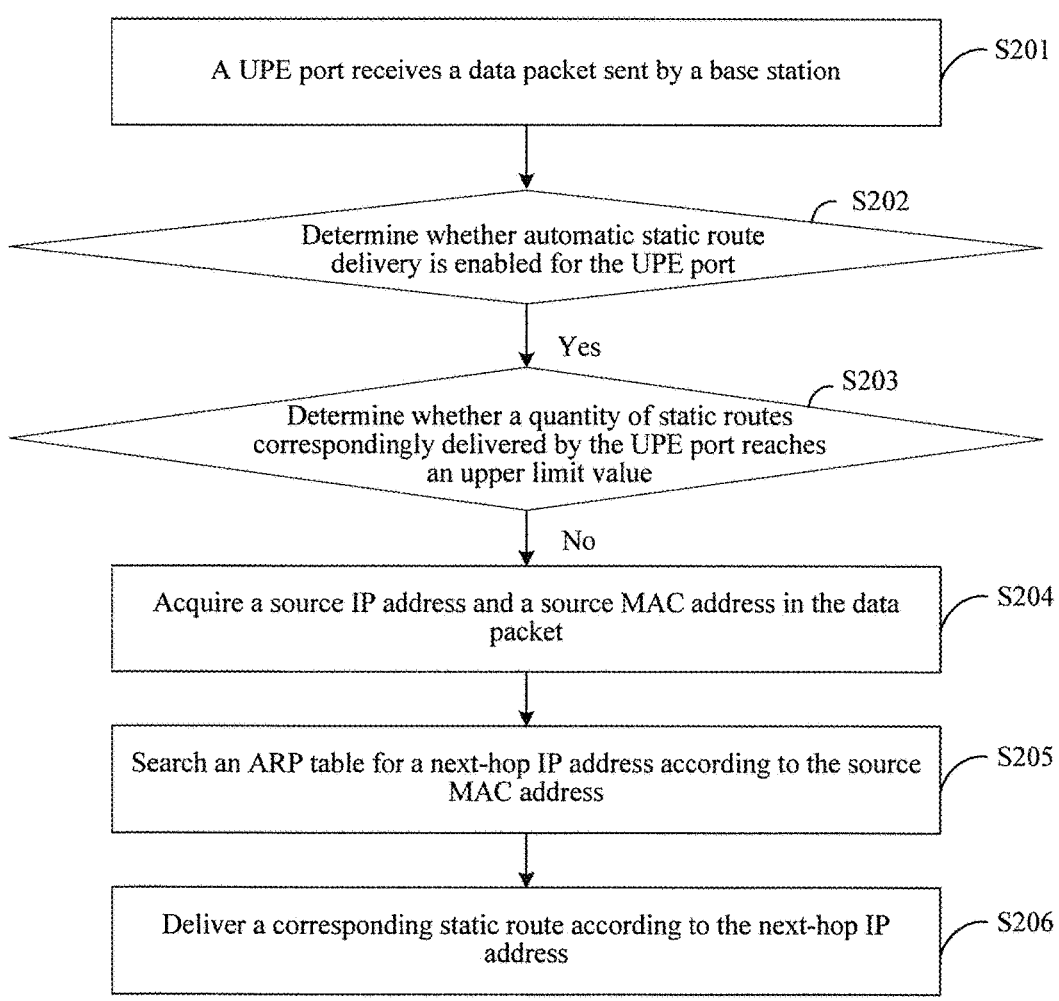
FIG. 2 is a schematic diagram of an implementation process of a method for delivering a static route according to Embodiment 2 of the present invention.

Referring to FIG. 2, FIG. 2 is an implementation process of a method for delivering a static route according to Embodiment 2 of the present invention, where the implementation process includes:

S201: A UPE port receives a data packet sent by a base station.

S202: Determine whether automatic static route delivery is enabled for the UPE port.

In this embodiment of the present invention, a function of enabling automatic static route delivery for the UPE port is preset. For example, if the automatic static route delivery is set to be enabled for the UPE port, an attribute of the UPE port is marked as 1; and if the automatic static route delivery is set to be disabled for the UPE port, the attribute of the UPE port is marked as 0. In this embodiment of the present invention, whether the automatic static route delivery is enabled for the UPE port is determined by reading an attribute value of the function of enabling the automatic static route delivery for the UPE port.

S203: When it is determined that the automatic static route delivery is enabled, further determine whether a quantity of static routes correspondingly delivered by the UPE port reaches an upper limit value; or when it is determined that the automatic static route delivery is not enabled, end this operation.

S204: When it is determined that the quantity of static routes correspondingly delivered by the UPE port does not reach the upper limit value, acquire a source IP address and a source MAC address in the data packet; or when it is determined that the upper limit value is reached, end this operation.

S205: Search an ARP (Address Resolution Protocol, Address Resolution Protocol) table for a next-hop IP address according to the source MAC address.

S206: Deliver a corresponding static route according to the next-hop IP address.

Embodiment 3

Figure 3:
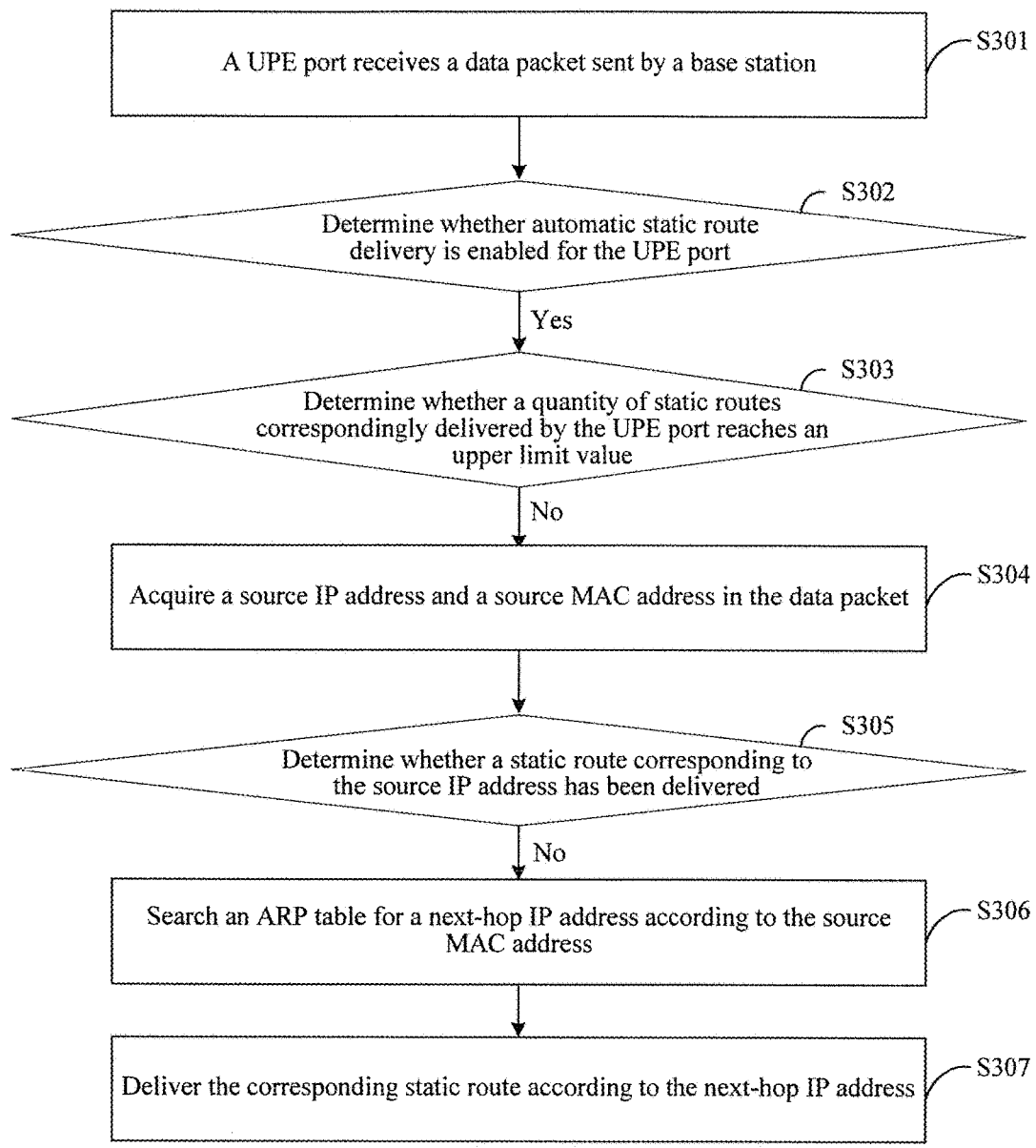
FIG. 3 is a schematic diagram of an implementation process of a method for delivering a static route according to Embodiment 3 of the present invention.

Referring to FIG. 3, FIG. 2 is an implementation process of a method for delivering a static route according to Embodiment 3 of the present invention, where the implementation process includes:

S301: A UPE port receives a data packet sent by a base station.

S302: Determine whether automatic static route delivery is enabled for the UPE port.

S303: When it is determined that the automatic static route delivery is enabled, further determine whether a quantity of static routes correspondingly delivered by the UPE port reaches an upper limit value; or when it is determined that the automatic static route delivery is not enabled, end this operation.

S304: When it is determined that the quantity of static routes correspondingly delivered by the UPE port does not reach the upper limit value, acquire a source IP address and a source MAC address in the data packet; or when it is determined that the upper limit value is reached, end this operation.

S305: Further determine whether a static route corresponding to the source IP address has been delivered.

S306: When it is determined that the static route corresponding to the source IP has not been delivered, search an ARP table for a next-hop IP address according to the source MAC address; or when it is determined that the static route corresponding to the source IP has been delivered, end this operation.

S307: Deliver the corresponding static route according to the next-hop IP address.

The following describes an application scenario by using an example.

After acquiring a configuration file from a server and restarting, the base station loads a management IP and a service IP, and all source IP addresses of service packets to an RNC (Radio Network Controller, radio network controller) are service IPs. After a function of this solution is enabled on a router UPE, the UPE port receives the data packet sent by the base station and then checks the source IP address and the source MAC address in the packet, and if a static route to the IP does not exist, the static route is delivered. A destination address of the static route is a service address IP3 (that is, a detected source IP in the packet) of the base station, where the next hop of the static route is acquired from an ARP entry on the UPE. By using that multiple base stations hang under one subinterface on the UPE as an example, the ARP entry on the subinterface is as follows:

| IP ADDRESS | MAC ADDRESS |
|---|---|
| a.a.a.a | AAAA-AAAA-AAAA |
| b.b.b.b | BBBB-BBBB-BBBB |
| c.c.c.c | CCCC-CCCC-CCC |
| ... | |

If the detected source IP in the packet is the IP3, and the source MAC is CCCC-CCCC-CCCC, the static route is delivered.

Destination_IP=IP3, Next_Hop=c.c.c.c

For the function mentioned above, a range of enabling needs to be accurate to a specific physical interface or logic interface to ensure that devices hanging under the interface are all wireless base station devices, thereby guaranteeing that a packet sent by the hanging device only has a limited quantity of source IP addresses, avoiding unlawful attacks and delivery of a large quantity of useless static routes.

Moreover, because a quantity of base stations hanging under the UPE port is limited, a quantity of detected source IPs in the packet under each port is limited, that is, a quantity of static routes correspondingly delivered by a detected source IP of the port is limited, by determining whether the quantity of static routes correspondingly delivered by the UPE port reaches the upper limit value. If the quantity of the detected source IPs is limited to N, each time after the port detects a new source IP address and delivers a corresponding static route, remaining space is decreased by 1. After the quantity of the correspondingly delivered static routes reaches limitation of N, processing of a related process in this solution is not performed on a received packet.

Moreover, whether the static route corresponding to the source IP address has been delivered is determined, that is, a forwarding layer records the detected source IP address. If a source IP address carried in a received packet has been processed, and the corresponding static route is delivered, a subsequently received packet carrying the same source IP is not processed.

Moreover, after the packet is read, if the corresponding static route needs to be delivered, a message may be sent to a CPU (Central Processing Unit, central processing unit), and bandwidth limitation may be made on a sending channel of this category of message.

Embodiment 4

Figure 4:
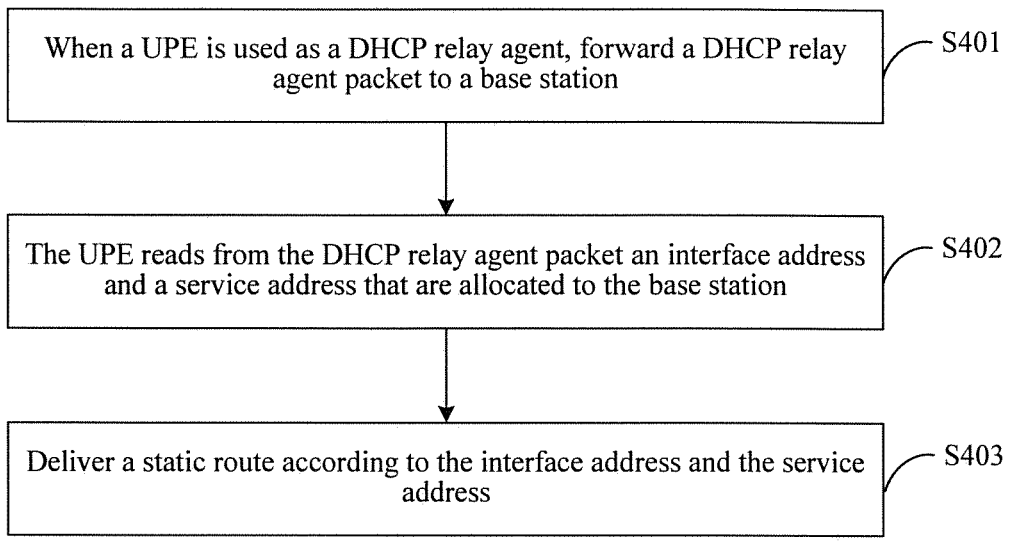
FIG. 4 is a schematic diagram of an implementation process of a method for delivering a static route according to Embodiment 4 of the present invention.

Referring to FIG. 4, FIG. 4 is an implementation process of a method for delivering a static route according to Embodiment 4 of the present invention, where the implementation process includes:

S401: When a UPE is used as a DHCP relay agent, forward a DHCP relay agent packet to a base station.

S402: The UPE reads from the DHCP relay agent packet an interface address and a service address that are allocated to the base station.

S403: Deliver a static route according to the interface address and the service address.

The following describes an application scenario by using an example.

When the base station starts, an IP address is acquired by means of a DHCP protocol. Moreover, in this process, a three-layer UPE device plays a role of the DHCP relay agent. A management address and the service address of the base station are preplanned on a DHCP server and are corresponding to ESNs of the base station. In this process, an RNC or a network management server is used as the DHCP server. By using the network management server as an example, the network management server includes information such as an interface IP, a management IP, and a mask length allocated to a base station, and fills the information in an Option 43 field of a DHCP packet. In this way, when the UPE is used as the DHCP relay agent, and a forwarding server allocates a packet of the IP address to a client, an interface address IP1 and a service address IP3 allocated to the base station may be read. A content format of the Option 43 field is customized by a manufacturer, and formats of the Option 43 field on a wireless side and a data communications UPE side need to be unified in advance at a software layer. The interface address IP1 and an interface address of the UPE connected to a base station side are in a same network segment. In this way, after the IP address is read from the UPE, a next static route may be, for example, delivered.

Destination_IP=IP3, Next_Hop=IP1

In this embodiment of the present invention, in this embodiment, corresponding information is acquired based on the Option 43 field customized by the manufacturer; the DHCP relay agent needs to check a format first, skip generating a static route if the format is not unified with a format of the DHCP relay agent, and report an error message.

Embodiment 5

Figure 5:
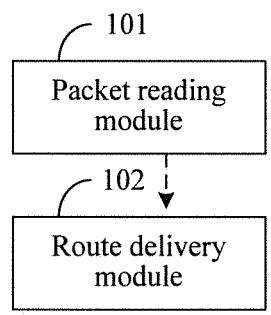
FIG. 5 is a schematic structural diagram of a UPE according to Embodiment 5 of the present invention.

Referring to FIG. 5, FIG. 5 is a structure of a UPE according to Embodiment 5 of the present invention. For ease of description, only a part related to this embodiment of the present invention is shown. The UPE includes: a packet reading module 101 and a route delivery module 102. The UPE may be a software unit, a hardware unit, or a unit formed by a combination of software and hardware.

The packet reading module 101 is configured to read a packet.

The route delivery module 102 is configured to deliver a corresponding static route according to related information carried in the packet.

Further, the packet reading module 101 is specifically configured to read a data packet sent by a base station, or configured to read a DHCP relay agent packet forwarded to a base station.

Further, the route delivery module 102 is specifically configured to, when the UPE reads the data packet sent by the base station, deliver, according to a source IP address and a source MAC address in the data packet, a static route that is from the UPE to a service address of the base station, or configured to, when the UPE reads the DHCP relay agent packet forwarded to the base station, deliver a static route according to an IP address in the DHCP relay agent packet.

Embodiment 6

Figure 6:
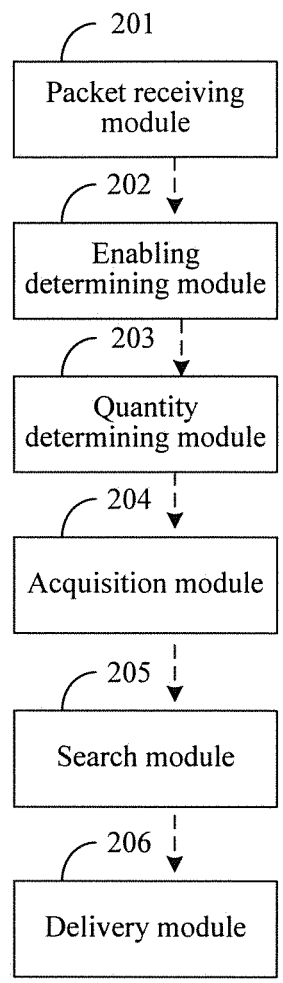
FIG. 6 is a schematic structural diagram of a UPE according to Embodiment 6 of the present invention.

Referring to FIG. 6, FIG. 6 is a structure of a UPE according to Embodiment 6 of the present invention. For ease of description, only a part related to this embodiment of the present invention is shown. The UPE includes: a packet receiving module 201, an enabling determining module 202, a quantity determining module 203, an acquisition module 204, a search module 205, and a delivery module 206. The UPE may be a software unit, a hardware unit, or a unit formed by a combination of software and hardware.

The packet receiving module is configured to receive a data packet sent by a base station.

The enabling determining module is configured to determine whether automatic static route delivery is enabled for the UPE port.

The quantity determining module is configured to, when it is determined that the automatic static route delivery is enabled, further determine whether a quantity of static routes correspondingly delivered by the UPE port reaches an upper limit value.

The acquisition module is configured to, when it is determined that the quantity of static routes correspondingly delivered by the UPE port does not reach the upper limit value, acquire a source IP address and a source MAC address in the data packet.

The search module is configured to search an ARP table for a next-hop IP address according to the source MAC address.

The delivery module is configured to deliver the corresponding static route according to the next-hop IP address.

Embodiment 7

Figure 7:
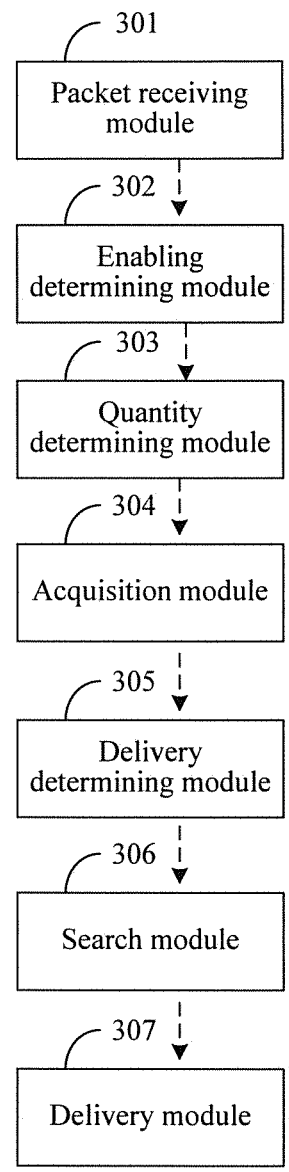
FIG. 7 is a schematic structural diagram of a UPE according to Embodiment 7 of the present invention.

Referring to FIG. 7, FIG. 7 is a structure of a UPE according to Embodiment 7 of the present invention. For ease of description, only a part related to this embodiment of the present invention is shown. The UPE includes: a packet receiving module 301, an enabling determining module 302, a quantity determining module 303, an acquisition module 304, a delivery determining module 305, a search module 306, and a delivery module 307. The UPE may be a software unit, a hardware unit, or a unit formed by a combination of software and hardware.

The packet receiving module is configured to receive a data packet sent by a base station.

The enabling determining module is configured to determine whether automatic static route delivery is enabled for the UPE port.

The quantity determining module is configured to, when it is determined that the automatic static route delivery is enabled, further determine whether a quantity of static routes correspondingly delivered by the UPE port reaches an upper limit value.

The acquisition module is configured to, when it is determined that the quantity of static routes correspondingly delivered by the UPE port does not reach the upper limit value, acquire a source IP address and a source MAC address in the data packet.

The delivery determining module is configured to determine whether a static route corresponding to the source IP address has been delivered.

The search module is configured to, when it is determined that the static route corresponding to the source IP has not been delivered, search an ARP table for a next-hop IP address according to the source MAC address.

The delivery module is configured to deliver the corresponding static route according to the next-hop IP address.

Embodiment 8

Figure 8:
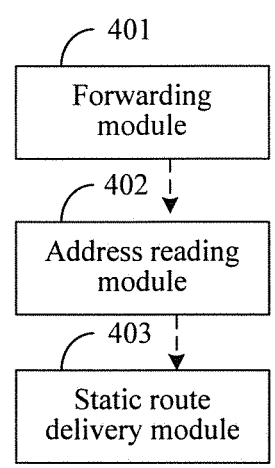
FIG. 8 is a schematic structural diagram of a UPE according to Embodiment 8 of the present invention.

Referring to FIG. 8, FIG. 8 is a structure of a UPE according to Embodiment 8 of the present invention. For ease of description, only a part related to this embodiment of the present invention is shown. The UPE includes: a forwarding module 401, an address reading module 402, and a static route delivery module 402. The UPE may be a software unit, a hardware unit, or a unit formed by a combination of software and hardware.

The forwarding module is configured to, when the UPE is used as a DHCP relay agent, forward a DHCP relay agent packet to a base station.

The address reading module is configured to read from the DHCP relay agent packet an interface address and a service address that are allocated to the base station.

The static route delivery module is configured to deliver a static route according to the interface address and the service address.

Embodiment 9

Figure 9:
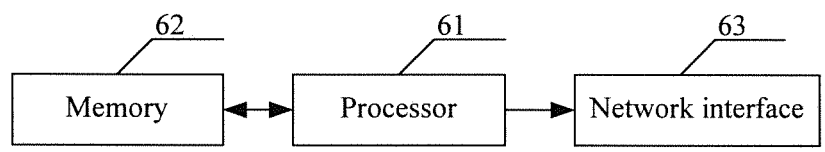
FIG. 9 is a schematic structural diagram of a UPE according to Embodiment 9 of the present invention.

Referring to FIG. 9, a UPE according to Embodiment 9 of the present invention includes: a processor 61, a memory 62, and a network interface 63.

The processor 61 is configured to execute a program.

In this embodiment of the present invention, the program may include program code, where the program code includes a computer operation instruction.

The processor 61 may be a central processing unit CPU or may be one or more integrated circuits configured to implement this embodiment of the present invention.

The memory 62 is configured to store the program.

The memory 62 may include a random access memory, and may also include a non-volatile memory.

The network interface 63 is configured to read a packet.

In this embodiment of the present invention, the network interface is a network adapter.

When the processor runs, the processor 61 is configured to execute the program stored in the memory 62 to enable the processor to perform the following method:

delivering, by the processor 61, a corresponding static route according to related information carried in the packet.

In conclusion, in the embodiments of the present invention, a packet is read by using a UPE; and a corresponding static route is delivered according to related information carried in the packet, thereby avoiding problems that when a site is deployed on a large-scale radio access network, a base station cannot operate normally and a data communications device repeatedly performs troubleshooting and debugging on site caused by differences between preliminary data planning and actual site deployment data. A static route is automatically delivered by processing a packet, thereby reducing manpower costs and avoiding occurrence of human errors.

A person of ordinary skill in the art may understand that all or some of the steps of the methods in the embodiments may be implemented by a program instructing related hardware. The program may be stored in a computer readable storage medium, such as a ROM, a RAM, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for delivering a static route, the method comprising:
    forwarding, by an ultimate provider edge (UPE), a Dynamic Host Configuration Protocol (DHCP) relay agent packet to a base station, wherein the DHCP relay agent packet carries an interface address and a service address allocated to the base station, and the service address is a source internet protocol (IP) address of a service packet transmitted to a Radio Network Controller (RNC);
    reading, by the UPE, the interface address and the service address allocated to the base station from the DHCP relay agent packet; and
    delivering, by the UPE, a corresponding static route according to the interface address and the service address, wherein a destination IP address in the static route is equal to the service address and a next hop in the static route is equal to the interface address.

2. The method according to claim 1, wherein the DHCP relay agent packet is sent by a DHCP server, and the RNC or a network management server is used as the DHCP server.

3. The method according to claim 1, wherein the UPE comprises a DHCP relay agent.

4. The method according to claim 1, wherein the interface address and an interface address of the UPE connected to the base station are in a same network segment.

5. The method according to claim 1, wherein the interface address and the service address are carried in an Option 43 field of the DHCP relay agent packet.

6. An ultimate provider edge (UPE), comprising:
    a processor; and
    a memory coupled to the processor, the memory comprising instructions that, when executed by the processor, cause the UPE to:
        forward a Dynamic Host Configuration Protocol (DHCP) relay agent packet to a base station, wherein the DHCP relay agent packet carries an interface address and a service address allocated to the base station, and the service address is a source internet protocol (IP) address of a service packet transmitted to an Radio Network Controller (RNC);
        read the interface address and the service address allocated to the base station from the DHCP relay agent packet; and
        deliver a corresponding static route according to the interface address and the service address, wherein a destination IP address in the static route is equal to the service address and a next hop in the static route is equal to the interface address.

7. The UPE according to claim 6, wherein the DHCP relay agent packet is sent by a DHCP server, and the RNC or a network management server is used as the DHCP server.

8. The UPE according to claim 6, wherein the UPE comprises a DHCP relay agent.

9. The UPE according to claim 6, wherein the interface address and an interface address of the UPE connected to the base station are in a same network segment.

10. The UPE according to claim 6, wherein the interface address and the service address are carried in an Option 43 field of the DHCP relay agent packet.

* * * * *